US012347086B2

(12) United States Patent
Chen et al.

(10) Patent No.: US 12,347,086 B2
(45) Date of Patent: Jul. 1, 2025

(54) METHOD AND SYSTEM OF MULTI-ATTRIBUTE NETWORK BASED FAKE IMAGERY DETECTION (MANFID)

(71) Applicant: Intelligent Fusion Technology, Inc., Germantown, MD (US)

(72) Inventors: Hua-Mei Chen, Germantown, MD (US); Bora Sul, Germantown, MD (US); Genshe Chen, Germantown, MD (US); Erik Blasch, Arlington, VA (US); Khanh Pham, Kirtland AFB, NM (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 396 days.

(21) Appl. No.: 17/876,908

(22) Filed: Jul. 29, 2022

(65) Prior Publication Data

US 2023/0040237 A1 Feb. 9, 2023

Related U.S. Application Data

(60) Provisional application No. 63/227,128, filed on Jul. 29, 2021.

(51) Int. Cl.
*G06T 7/00* (2017.01)
*G06V 10/80* (2022.01)
*G06V 10/82* (2022.01)

(52) U.S. Cl.
CPC .......... *G06T 7/0002* (2013.01); *G06V 10/811* (2022.01); *G06V 10/82* (2022.01);
(Continued)

(58) Field of Classification Search
CPC ......... G06T 7/0002; G06T 2207/20056; G06T 2207/20081; G06T 2207/20084;
(Continued)

(56) References Cited

U.S. PATENT DOCUMENTS

2020/0160502 A1* 5/2020 Nießner .............. G06V 10/431
2020/0234428 A1* 7/2020 George ................. G06N 3/082
(Continued)

OTHER PUBLICATIONS

Hongyi Zhang, "mixup: Beyond Empirical Risk Minimization", ICLR, Apr. 27, 2018.
(Continued)

*Primary Examiner* — Bobbak Safaipour
*Assistant Examiner* — Michael Kim Maiden
(74) *Attorney, Agent, or Firm* — ANOVA LAW GROUP, PLLC

(57) ABSTRACT

A method for detecting fake images includes: obtaining an image for authentication, and hand-crafting a multi-attribute classifier to determine whether the image is authentic. Hand-crafting the multi-attribute classifier includes fusing at least an image classifier, an image spectrum classifier, a co-occurrence matrix classifier, and a one-dimensional (1D) power spectrum density (PSD) classifier. The multi-attribute classifier is trained by pre-processing training images to generate an attribute-specific training dataset to train each of the image classifier, the image spectrum classifier, the co-occurrence matrix classifier, and the 1D PSD classifier.

18 Claims, 9 Drawing Sheets

A large number of images → GAN or other machine learning based image generation → Realistic fake images that are difficult to detect

(52) U.S. Cl.
CPC ............... *G06T 2207/20081* (2013.01); *G06T 2207/20084* (2013.01)

(58) Field of Classification Search
CPC ............. G06T 7/00; G06T 2207/10016; G06T 2207/20016; G06T 2207/20076; G06V 10/811; G06V 10/82
See application file for complete search history.

(56) References Cited

U.S. PATENT DOCUMENTS

| | | | |
|---|---|---|---|
| 2021/0089964 A1* | 3/2021 | Zhang | G06F 18/2115 |
| 2021/0209388 A1* | 7/2021 | Ciftci | G06N 3/045 |
| 2021/0209415 A1* | 7/2021 | Nataraj | G06V 10/82 |

OTHER PUBLICATIONS

Ricard Durall et al., "Unmasking DeepFakes with simple Features", Mar. 4, 2020. https://github.com/cc-hpc-itwm/DeepFakeDetection.

Sheng-Yu Wang et al., "CNN-generated images are surprisingly easy to spot . . . for now", Apr. 4, 2020 https://peterwang512.github.io/CNNDetection/.

Lakshmanan Nataraj et al., "Detecting GAN generated Fake Images using Co-occurrence Matrices", Society for Imaging Science and Technology, 2019. https://doi.org/10.2352/ISSN.2470-1173.2019.5.MWSF-532.

Simone Scardapane et al., "Group Sparse Regularization for Deep Neural Networks", IEEE, Jul. 2, 2016.

Ming Yuan et al., "Model Selection and Estimation in Regression with Grouped Variables", Department of Statistics in University of Wisconsin, Nov. 9, 2004.

* cited by examiner

METHOD AND SYSTEM OF MULTI-ATTRIBUTE NETWORK BASED FAKE IMAGERY DETECTION (MANFID)

CROSS-REFERENCE TO RELATED APPLICATION

This application claims the priority of U.S. Provisional Application No. 63/227,128, filed on Jul. 29, 2021, the content of which is incorporated herein by reference in its entirety.

GOVERNMENT RIGHTS

The present disclosure was made with Government support under Contract No. FA8649-21-P-1312, awarded by the United States Air Force. The U.S. Government has certain rights in the present disclosure.

FIELD OF THE DISCLOSURE

The present disclosure generally relates to the field of media forensics and semantic forensics technology and, more particularly, relates to a method and a system of fake imagery detection based on multi-attribute neural network.

BACKGROUND

Current developments in computer vision and deep learning allow automatic generation of hyper-realistic images, which are hardly distinguishable from real ones. Very realistic fake multimedia, referred to as deepfakes, have become a serious issue within the Department of Defense (DoD) as it challenges the collection and passing of Open Source Intelligence (OSINT). Generative adversarial networks (GAN) are widely used to generate fake images and GAN generated images do leave unique fingerprints, which are very sensitive to the hyperparameters including training data and random seeds for network initialization. The present disclosure provides a multi-attribute network based fake imagery detection (MANFID) method to detect fake images from multiple unknown image generation algorithms. The MANFID method combines both hand-crafted features and convolutional neural network (CNN) learned features.

BRIEF SUMMARY OF THE DISCLOSURE

One aspect of the present disclosure includes a method for detecting fake images The method includes obtaining an image for authentication; and hand-crafting a multi-attribute classifier to determine whether the image is authentic. Hand-crafting the multi-attribute classifier includes fusing at least an image classifier, an image spectrum classifier, a co-occurrence matrix classifier, and a one-dimensional (1D) power spectrum density (PSD) classifier. The multi-attribute classifier is trained by pre-processing training images to generate an attribute-specific training dataset to train each of the image classifier, the image spectrum classifier, the co-occurrence matrix classifier, and the 1D PSD classifier.

Another aspect of the present disclosure includes a system for detecting fake images. The system includes a memory storing computer program instructions, and a processor coupled to the memory and, when executing the computer program instructions, configured to perform: obtaining an image for authentication; and hand-crafting a multi-attribute classifier to determine whether the image is authentic. Hand-crafting the multi-attribute classifier includes fusing at least an image classifier, an image spectrum classifier, a co-occurrence matrix classifier, and a one-dimensional (1D) power spectrum density (PSD) classifier. The multi-attribute classifier is trained by pre-processing training images to generate an attribute-specific training dataset to train each of the image classifier, the image spectrum classifier, the co-occurrence matrix classifier, and the 1D PSD classifier.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Manipulation of visual media is enabled by the wide scale availability of sophisticated image and video editing applications as well as automated manipulation algorithms that permit editing in ways that are very difficult to detect either visually or with current image analysis and visual media forensic tools. In particular, generative adversarial networks (GANs) have been the most popular in image enhancement and manipulation. A combination of GANs and commonly available image editing tools can be used to modify digital images to such an extent that doctored images are indistinguishable from normal ones. The forensic tools used today lack robustness and scalability, and address only some aspects of media authentication. An end-to-end platform to perform a complete and automated forensic analysis does not exist.

Figure 1:
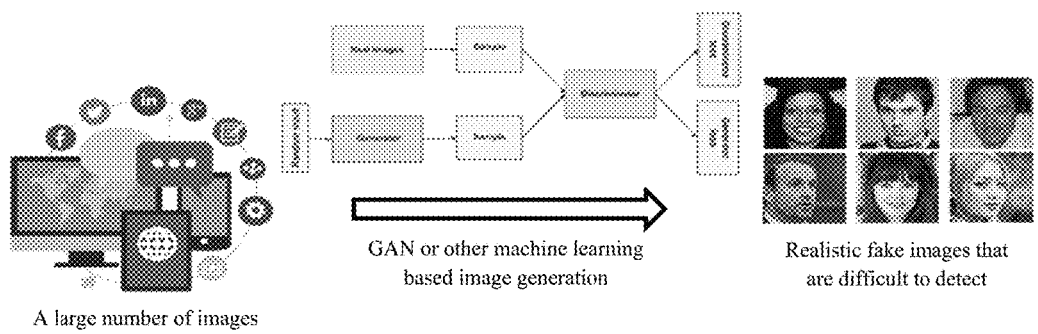
FIG. 1 illustrates a schematic diagram of generation of realistic fake imagery.

FIG. 1 illustrates a schematic diagram of generation of realistic fake imagery. As shown in FIG. 1, a large number of images are generated by numerous imaging devices. The real images and the machine generated images are inputted into a discriminator. A discriminator loss and a generator loss are calculated. The losses are minimized by a machine learning algorithm until the real images and the machine generated images are hardly distinguishable.

Although the GANs generated images are nearly indistinguishable from the real images, the GANs based techniques do alter the statistics of pixels in the GANs generated images and make it possible to detect the fake images.

The present disclosure provides a system of multi-attribute network based fake imagery detection (MANFID). The MANFID system offers artificial intelligence/machine learning (AI/ML) solutions to detect the fake images from multiple unknown image generation algorithms.

Images in question are inputted into the MANFID system to automatically perform forgery detection, attribution and characterization of falsified media. The MANFID system can be used by analysts of intelligence resource centers to verify intelligence sources and the veracity of information and to identify the originators ad spreaders of misinformation and disinformation. The MANFID system can also be used by policy makers to identify falsified multimodal documents, such as entire new stories with embedded photos and videos. The MANFID system can also be used by social safety officers to identify national security threats posed by compelling media manipulations.

Figure 2:
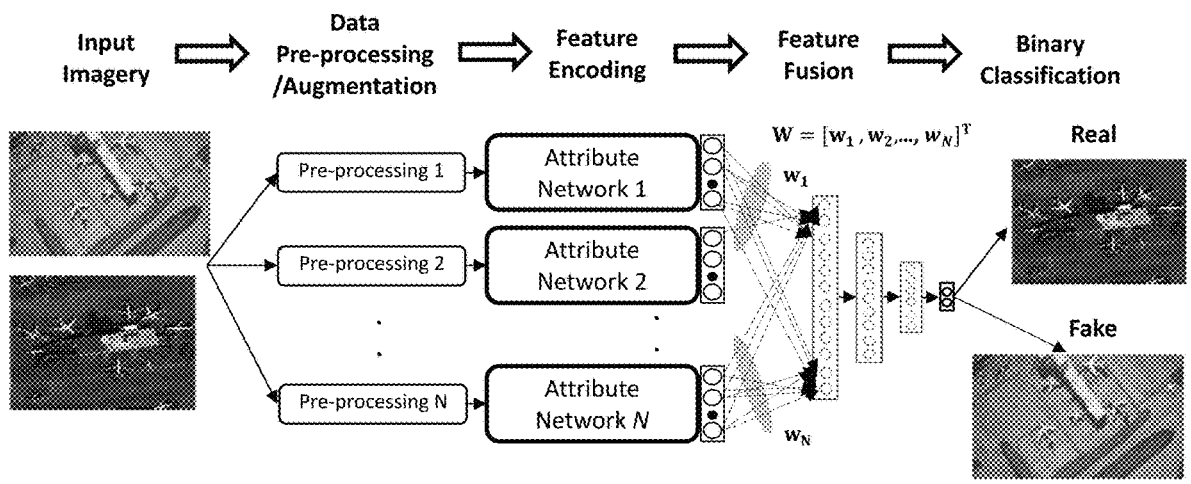
FIG. 2 illustrates a schematic diagram of an architecture of an exemplary system for detecting fake images according to various disclosed embodiments of the present disclosure.

FIG. 2 illustrates a schematic diagram of an architecture of an exemplary system for detecting fake images according to various disclosed embodiments of the present disclosure. For example, the system for detecting fake images can be the MANFID system. As shown in FIG. 2, an image for authentication is inputted into the system to be pre-processed for each attribute network. Image data pre-processed for each attribute network are inputted into corresponding attribute network for further processing. Outputs of each attribute network are fused to generate a binary output indicating whether the image is real or fake.

Although the system is used to detect fake images, it can also be used to detect fake videos. A video can be divided into a plurality of frames. Each frame can be treated as an image. If the image is determined by the system to be a fake image, the video is determined to be a fake video.

Figure 3A:
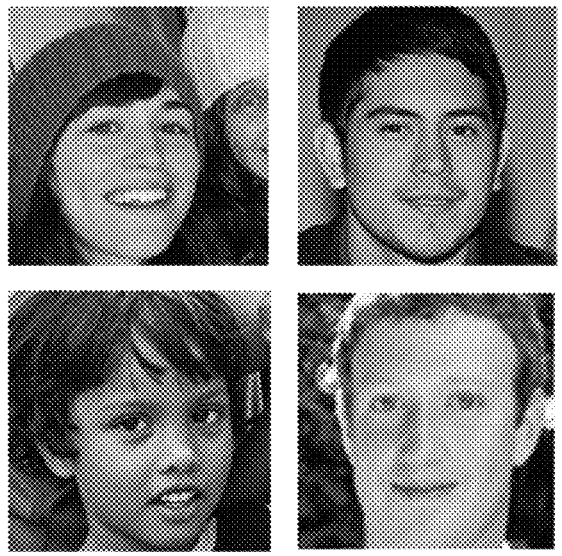
FIG. 3A illustrates exemplary real images.
Figure 3B:
FIG. 3B illustrates exemplary fake images generated from various GANs.

As shown in FIG. 2, the system is based on a multi-attribute neural network. The multi-attribute neural network is trained with training images, for example, images shown in FIG. 3A and FIG. 3B. The training images are pre-processed to generate an attribute-specific training dataset to train each attribute network of the multi-attribute network. The multi-attribute network includes an image classifier, an image spectrum classifier, a co-occurrence matrix classifier, and a one-dimensional (1D) power spectrum density (PSD) classifier, or a combination thereof.

The training images include high resolution real images such as FFHQ (1024×1024) and CelebA-HQ (1024×1024), low resolution real images such as Kaggle-600 (600×600) and CelebA-128 (128×128), fakes images from different GANs such as StyleGAN-psi-05 (high resolution), StyleGAN-psi-07 (high resolution), StyleGAN-psi-10 (high resolution), StyleGAN2-psi-05 (high resolution), StyleGAN2-psi-10 (high resolution), ProGAN-HQ (high resolution), ProGAN-v0 (low resolution), ProGAN-v1 (low resolution), and SNGAN (low resolution).

Due to limited availability of the training images, the training images are pre-processed to artificially increase a size of training dataset for the multi-attribute neural network.

In some embodiments, pre-processing the training images corresponding to the image classifier includes performing an augmentation process on the training images to obtain a set of augmented training images, and performing a mixup process on the set of augmented training images to generate the attribute-specific training dataset to train the image classifier.

In some embodiments, the augmentation process includes rotation, translation, cropping, resizing, JPEG compression, flipping, blurring, random erasing, or a combination thereof.

It should be noted that the more diverse the types of the training images, the more effective the training of the multi-attribute neural network. For example, training images may include human faces, animals, plants, landscapes, cars, games, furniture, paintings, buildings, foods, space images, etc.

In some embodiments, the mixup process is a form of data augmentation having a vicinal distribution and behaves linearly in-between training samples. The linear behaviors reduce the number of undesirable oscillations when predicting outside the training samples. The mixup process leads to decision boundaries that transition linearly from class to class, providing a smoother estimate of uncertainty. The mixup process includes random convex combination of raw inputs, and convex combination of one-hot label encodings.

In some embodiments, pre-processing the training images corresponding to the image spectrum classifier includes performing the augmentation process on the training images to obtain the set of augmented training images, performing the mixup process on the set of augmented training images to obtain the set of mixup training images, and performing the discrete Fourier transform (DFT) process on the set of mixup training images to generate the attribute-specific training dataset to train the image spectrum classifier.

In some embodiments, pre-processing the training images corresponding to the co-occurrence matrices classifier includes performing the augmentation process on the training images to obtain the set of augmented training images, performing the mixup process on the set of augmented training images to obtain the set of mixup training images, and computing co-occurrence matrices directly on pixels on the set of mixup training images on each of the red, green and blue channels to generate the attribute-specific training dataset to train the co-occurrence matrix classifier.

In some embodiments, pre-processing the training images corresponding to the one-dimensional (1D) power spectrum density classifier includes performing an augmentation process on the training images to obtain a set of augmented training images, performing a mixup process on the set of augmented training images to obtain a set of mixup training images, performing a discrete Fourier transform on the set of mixup training images to obtain a set of two-dimensional (2D) amplitude spectrums of the set of mixup training images, and performing an azimuthal averaging of the set of 2D amplitude spectrums to generate the attribute-specific training dataset to train the 1D PSD classifier.

Figure 4:
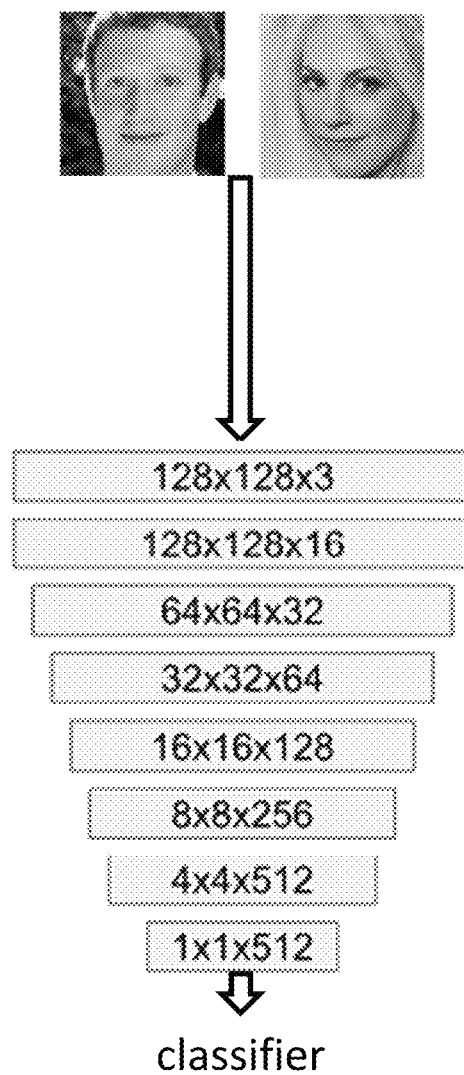
FIG. 4 illustrates a schematic diagram of an exemplary image classifier according to various disclosed embodiments of the present disclosure.

FIG. 4 illustrates a schematic diagram of an exemplary image classifier according to various disclosed embodiments of the present disclosure. As shown in FIG. 4, the image classifier includes a multi-layer convolutional neural network (CNN). The multi-layer CNN includes a 128×128×3 convolutional layer, a 128×128×16 convolutional layer, a 64×64×32 convolutional layer, a 32×32×64 convolutional layer, a 16×16×128 convolutional layer, a 8×8×256 convolutional layer, a 4×4×512 convolutional layer, and a 1×1×512 convolutional layer, that are cascaded together.

Figure 5:
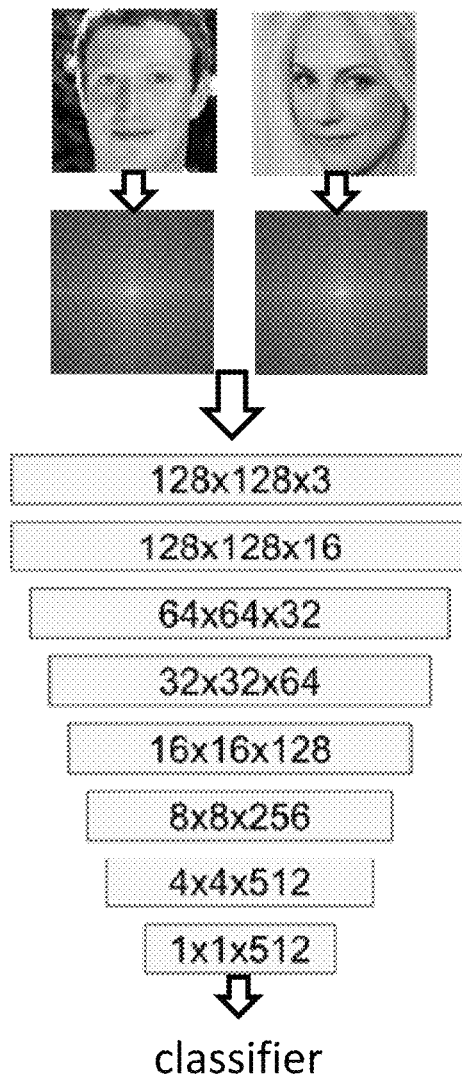
FIG. 5 illustrates a schematic diagram of an exemplary image spectrum classifier according to various disclosed embodiments of the present disclosure.

FIG. 5 illustrates a schematic diagram of an exemplary image spectrum classifier according to various disclosed embodiments of the present disclosure. As shown in FIG. 5, the image spectrum classifier is similar to the image classifier in FIG. 4, except that an input to the image spectrum classifier is a spectrum of the training image while an input to the image classifier is the training image itself.

Figure 6:
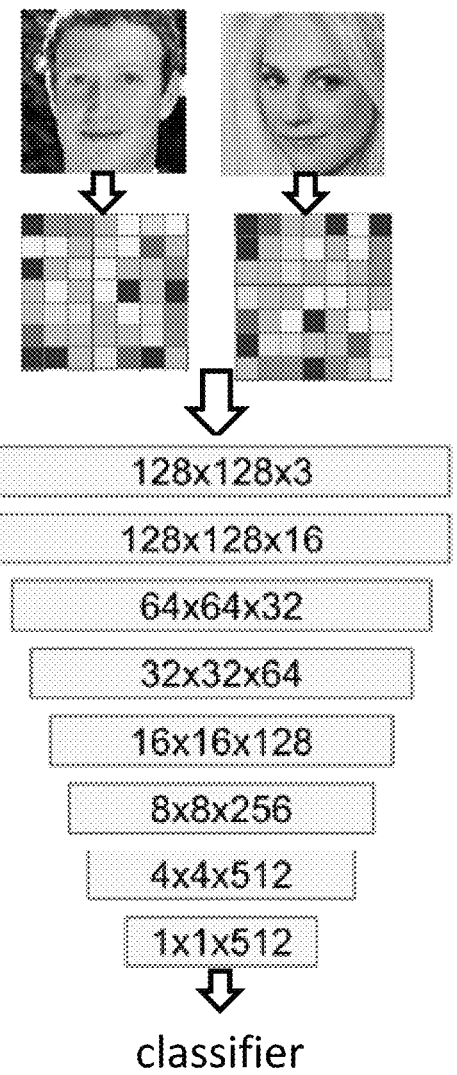
FIG. 6 illustrates a schematic diagram of an exemplary co-occurrence matrix classifier according to various disclosed embodiments of the present disclosure.

FIG. 6 illustrates a schematic diagram of an exemplary co-occurrence matrix classifier according to various disclosed embodiments of the present disclosure. As shown in FIG. 6, the co-occurrence matrix classifier is similar to the image classifier in FIG. 4, except that an input to the co-occurrence matrix classifier is a co-occurrence matrix of the training image while the input to the image classifier is the training image itself.

Figure 7:
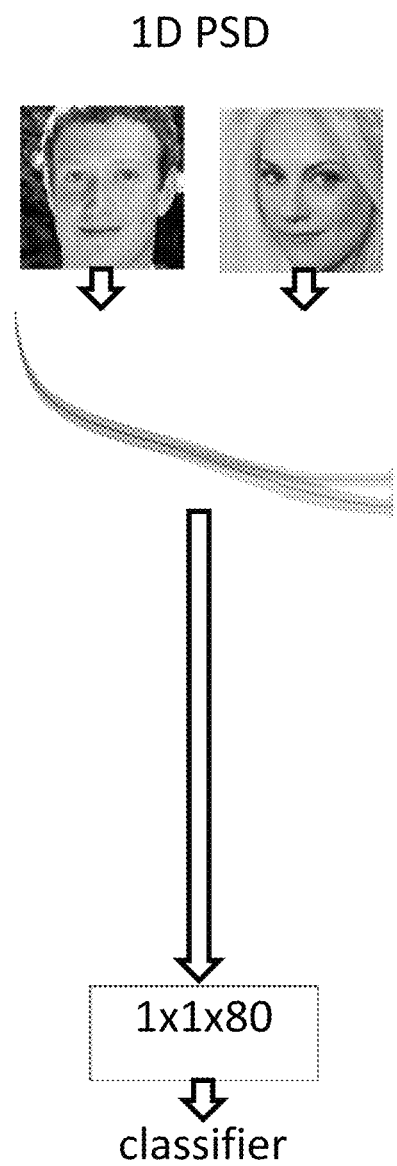
FIG. 7 illustrates a schematic diagram of an exemplary 1D PSD classifier according to various disclosed embodiments of the present disclosure.

FIG. 7 illustrates a schematic diagram of an exemplary 1D PSD classifier according to various disclosed embodiments of the present disclosure. As shown in FIG. 7, the 1D PSD classifier includes a single layer CNN. The single layer CNN includes a 1×1×80 convolutional layer.

Figure 8:
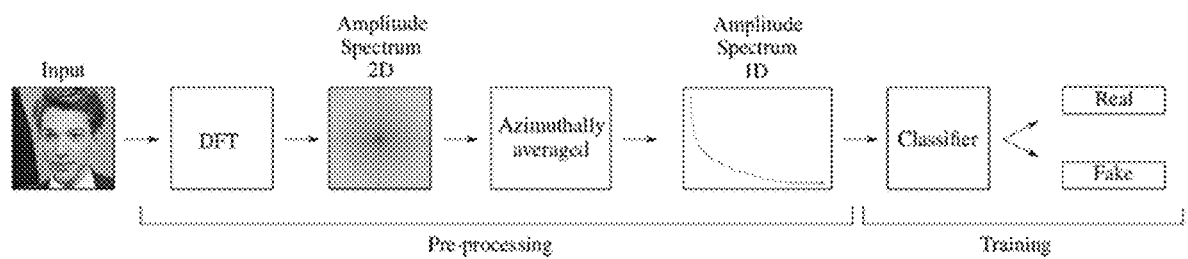
FIG. 8 illustrates a schematic diagram of using an exemplary 1D PSD classifier to detect fake images according to various disclosed embodiments of the present disclosure.

FIG. 8 illustrates a schematic diagram of using an exemplary 1D PSD classifier to detect fake images according to various disclosed embodiments of the present disclosure. As shown in FIG. 8, the image for authentication is pre-processed by performing the augmentation process on the image to obtain a set of augmented images, performing the mixup process on the set of augmented images to obtain a set of mixup images, performing a discrete Fourier transform on the set of mixup images to obtain a set of 2D amplitude spectrums of the set of mixup images, and performing an azimuthal averaging of the set of 2D amplitude spectrums to generate the attribute-specific image data, that is inputted into the 1D PSD classifier.

In some embodiments, the 1D PSD classifier supports a logistic regression algorithm, a support vector machine (SVM) algorithm, a K-means clustering algorithm, or a combination thereof.

Figure 9:
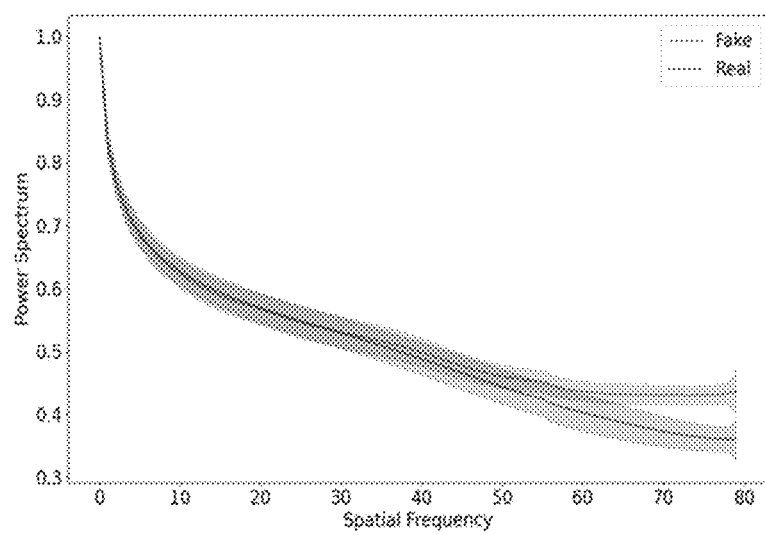
FIG. 9 illustrates a schematic diagram of exemplary power spectrums for a real image from FFHQ and a fake image from StyleGAN_05 according to various disclosed embodiments of the present disclosure.
Figure 10:
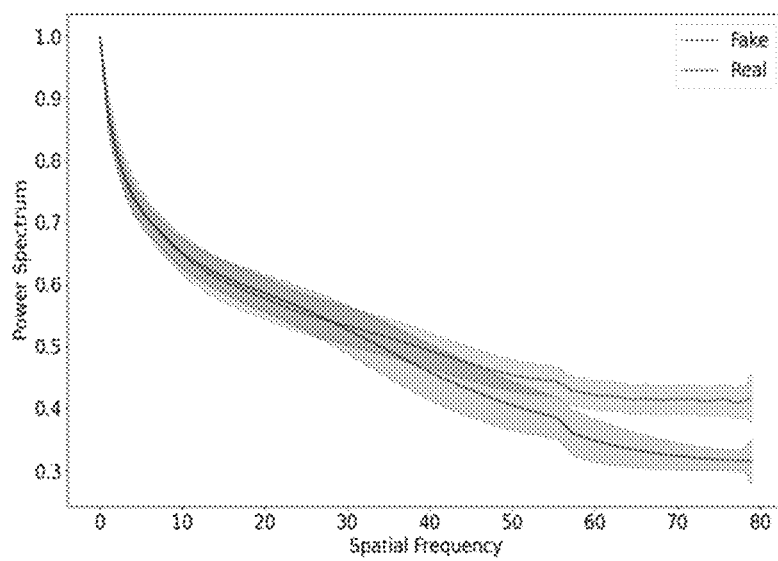
FIG. 10 illustrates a schematic diagram of exemplary power spectrums for a real image from CelebA and a fake image from StyleGAN_10 according to various disclosed embodiments of the present disclosure.

FIG. 9 illustrates a schematic diagram of exemplary power spectrums for a real image from FFHQ and a fake image from StyleGAN_05 according to various disclosed embodiments of the present disclosure. FIG. 10 illustrates a schematic diagram of exemplary power spectrums for a real image from CelebA and a fake image from StyleGAN_10 according to various disclosed embodiments of the present disclosure.

In some embodiments, the multi-attribute neural network includes the 1D PSD attribute network, i.e., the 1D PSD classifier. The training and testing results of the multi-attribute neural network including the 1D PSD attribute network are summarized below in Table 1. As can be seen from Table 1, the 1D PSD based multi-attribute neural network performs well for high resolution images.

TABLE 1

| Training Testing | | FFHQ + StyleGAN-05 (high resolution) | CelebA-128 + ProGAN-v0 (low resolution) |
|---|---|---|---|
| Real | FFHQ | 96% (training data) | 96% (good generalization) |
| | CelebA-HQ | 99% (good generalization) | 100% (good generalization) |
| | CelebA-128 | 25% | 80% (training data) |
| | Kaggle-600 | 71% (good generalization) | 91% (good generalization) |
| Fake | StyleGAN-05 | 99% (training data) | 47% |
| | StyleGAN-07 | 100% (good generalization) | 43% |
| | StyleGAN-10 | 99% (good generalization) | 50% |
| | ProGAN-v0 | 99% (good generalization) | 76% (training data) |
| | ProGAN-v1 | 100% (good generalization) | 68% (fair generalization) |
| | SNGAN | 100% (good generalization) | 72% (fair generalization) |

Figure 11:
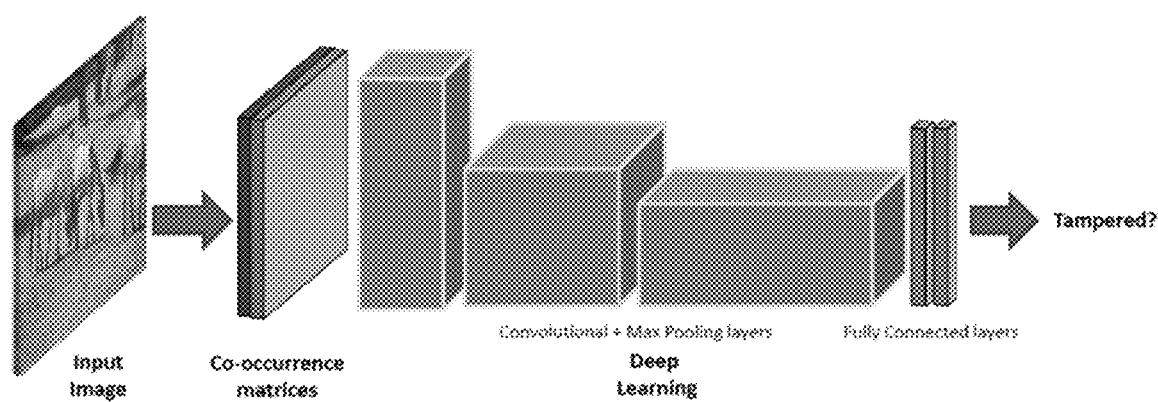
FIG. 11 illustrates a schematic diagram of using an exemplary co-occurrence matrix classifier to detect fake images according to various disclosed embodiments of the present disclosure.

FIG. 11 illustrates a schematic diagram of using an exemplary co-occurrence matrix classifier to detect fake images according to various disclosed embodiments of the present disclosure. Co-occurrence matrices of the image for authentication are calculated directly on the image pixels on each of the red, green and blue (RGB) channels and are passed through a CNN, thereby allowing the CNN to learn important features from the co-occurrence matrices. As shown in FIG. 11, the co-occurrence matrices are computed on the RGB channels to obtain a 3×256×256 tensor. The tensor is then passed through a multi-layer deep CNN including conv layer with 32 3×3 convs+ReLu layer+conv layer with 32 5×5 convs +max pooling layer+conv layer with 64 3×3 convs+ReLu layer+conv layer with 64 5×5 convs+max pooling layer+conv layer with 128 3×3 convs+ReLu layer+conv layer with 128 5×5 convs+max pooling layer+256 dense layer+256 dense layer+sigmoid layer. A variant of adaptive stochastic gradient descent is used as the optimizer.

In some embodiments, the multi-attribute neural network includes the co-occurrence matrix attribute network, i.e., the co-occurrence matrix classifier. The training and testing results of the multi-attribute neural network including the co-occurrence matrix attribute network are summarized below in Table 2. As can be seen from Table 2, the co-occurrence matrix based multi-attribute neural network performs well for high resolution real images and low resolution fake images.

TABLE 2

| Training Testing | | FFHQ + StyleGAN-05 (high resolution) | CelebA-128 + ProGAN-v0 (low resolution) |
|---|---|---|---|
| Real | FFHQ | 83% | 58% |
| | CelebA-HQ | 91% | 49% |
| | CelebA-128 | 59% | 95% |
| | Kagg le-600 | 63% | 64% |

TABLE 2-continued

|  | Training Testing | FFHQ + StyleGAN-05 (high resolution) | CelebA-128 + ProGAN-v0 (low resolution) |
|---|---|---|---|
| Fake | StyleGAN-05 | 98% | 9% |
|  | StyleGAN-07 | 94% | 14% |
|  | StyleGAN-10 | 85% | 17% |
|  | ProGAN-v0 | 35% | 99% |
|  | ProGAN-v1 | 34% | 98% |
|  | SNGAN | 41% | 86% |

In some embodiments, the training and testing results of the 1D PSD attribute network and the co-occurrence matrix attribute network are summarized and compared below in Table 3. As can be seen from Table 3, 1D PSD and the co-occurrence matrix based multi-attribute neural network performs well for all images of interest.

TABLE 3

|  | Training | FFHQ + StyleGAN-05 (high resolution) | | CelebA-128 +ProGAN-v0 (low resolution) | |
|---|---|---|---|---|---|
|  | Testing | Co-Matrix | PSD | Co-Matrix | PSD |
| Real | FFHQ | 83% | 96% | 58% | 96% |
|  | CelebA-HQ | 91% | 99% | 49% | 100% |
|  | CelebA-128 | 59% | 25% | 95% | 80% |
|  | Kaggle-600 | 63% | 71% | 64% | 91% |
| Fake | StyleGAN-05 | 98% | 99% | 9% | 47% |
|  | StyleGAN-07 | 94% | 100% | 14% | 48% |
|  | StyleGAN-10 | 85% | 99% | 17% | 50% |
|  | ProGAN-v0 | 35% | 99% | 99% | 76% |
|  | ProGAN-v1 | 34% | 100% | 98% | 68% |
|  | SNGAN | 41% | 100% | 86% | 72% |

In some embodiments, the multi-attribute neural network combines the 1D PSD attribute network and the co-occurrence matrix attribute network. The training and testing results of the multi-attribute neural network combining the 1D PSD attribute network and the co-occurrence matrix attribute network are summarized below in Table 4. As can be seen from Table 4, 1D PSD and the co-occurrence matrix based multi-attribute neural network performs well for images with high and low resolutions and multiple GAN types.

TABLE 4

|  | Training Testing | Real: FFHQ + CelebA_128 Fake: StyleGAN-05 + ProGAN_v0 (mixed high & low resolutions) Models: PSD + Co-Matrix (combined two networks) |
|---|---|---|
| Real | FFHQ | 99% |
|  | CelebA-HQ | 99% |
|  | CelebA-128 | 99% |
|  | Kaggle-600 | 92% |
| Fake | StyleGAN-05 | 99% |
|  | StyleGAN-07 | 98% |
|  | StyleGAN-10 | 97% |
|  | ProGAN-v0 | 99% |
|  | ProGAN-v1 | 97% |
|  | SNGAN | 74% |

In some embodiments, fusing at least the image classifier, the image spectrum classifier, the co-occurrence matrix classifier, and the 1D PSD classifier includes simultaneously performing neuron pruning and feature selection in a fusion neural network while optimizing weights of the fusion neural network using a sparse group lasso algorithm during a training stage of the fusion neural network. To enforce sparsity with weight decay is to artificially force to zero all weights that are lower, in absolute terms, than a certain threshold, e.g., $10^{-3}$. Thus, pruning and feature selection are simultaneously performed while optimizing the weights of the CNN.

Further, generalizability of the system is explored. Whether the multi-attribute network based classifier learned from one real-fake dataset can successfully distinguish another real-fake dataset, which are indistinguishable by the discriminator of the image generating GAN, is tested. The results are shown in Table 5 below. The same GAN with different random seed produces different fingerprints.

TABLE 5

| GAN | Training Real Imagery |
|---|---|
| ProGAN-HQ | CelebA-HQ |
| StyleGAN-psi_05 | FFHQ |
| StyleGAN-psi_07 | FFHQ |
| StyleGAN2-psi_05 | FFHQ |
| StyleGAN2-psi_10 | FFHQ |
| ProGAN-v0 | CelebA |
| ProGAN-v1 | CelebA |
| SNGAN | CelebA |

When the models are trained for a low resolution dataset (i.e., CelebA-128 and ProGAN-v0), the test results are summarized in Table 6 below. It can be seen from Table 6 that all models can be generalized to a same GAN family and SNGAN. The image spectrum model and the co-occurrence matrix model additionally generalize to some high resolution datasets. The Image spectrum model and the co-occurrence matrix model are combined with or without group sparsity selection. As can be seen from Table 6, the models trained for the low resolution training dataset perform well for the low resolution testing datasets, but do not perform well for the high resolution testing datasets.

TABLE 6

| Model(s) Testing | Image | Image spectrum | Co-occurrence matrix | 1D PSD |
|---|---|---|---|---|
| Real: CelebA HQ Fake:ProGANI-HQ | 45% | 75% | 68% | 50% |
| Real: FFHQ Fake: Style-v5 | 24% | 28% | 3% | 19% |
| Real: FFHQ Fake: Style-v7 | 25% | 27% | 4% | 19% |
| Real: FFHQ Fake: Style-v10 | 27% | 28% | 6% | 18% |
| Real: FFHQ Fake: Style2-v5 | 43% | 65% | 58% | 50% |
| Real: FFHQ Fake: Style2-v10 | 49% | 65% | 59% | 50% |
| Real: CelebA-128 Fake: ProGAN-v0 | 100% | 95% | 98% | 70% |
| Real: CelebA-128 Fake: ProGAN-v1 | 100% | 88% | 97% | 68% |
| Real: CelebA-128 Fake: SNGAN | 100% | 78% | 90% | 70% |

When the models are trained for a low resolution dataset (i.e., CelebA-128 and ProGAN-v0), the test results are summarized in Table 7 below. As can be seen from Table 7, a multi-attribute model combining the image spectrum model and the co-occurrence matrix model performs well as compared to the single attribute models.

| Model(s) Testing | Image | Image spectrum | Co-occurrence matrix | 1D PSD | Image spectrum + Co-occurrence matrix without GroupSparsity |
|---|---|---|---|---|---|
| Real: CelebA HQ Fake: ProGANI-HQ | 45% | 75% | 68% | 50% | 45% |
| Real: FFHQ Fake: Style-v5 | 24% | 28% | 3% | 19% | 50% |
| Real: FFHQ Fake: Style-v7 | 25% | 27% | 4% | 19% | 50% |
| Real: FFHQ Fake: Style-v10 | 27% | 28% | 6% | 18% | 49% |
| Real: FFHQ Fake: Style2-v5 | 43% | 65% | 58% | 50% | 70% |
| Real: FFHQ Fake: Style2-v10 | 49% | 65% | 59% | 50% | 72% |
| Real: CelebA-128 Fake: ProGAN-v0 | 100% | 95% | 98% | 70% | 100% |
| Real: CelebA-128 Fake: ProGAN-v1 | 100% | 88% | 97% | 68% | 99% |
| Real: CelebA-128 Fake: SNGAN | 100% | 78% | 90% | 70% | 93% |

When the models are trained for a low resolution dataset (i.e., CelebA-128 and ProGAN-v0), the test results are summarized in Table 8 below. As can be seen from Table 8, a multi-attribute model combining the image spectrum model and the co-occurrence matrix model with group sparsity fusion performs best as compared to the other attribute models.

TABLE 8

| Testing Model(s) | Image | Image spectrum | Co-occurrence matrix | 1D PSD | Image spectrum + Co-occurrence matrix without GroupSparsity | Image spectrum + Co-occurrence matrix with GroupSparsity |
|---|---|---|---|---|---|---|
| Real: CelebA_HQ Fake: ProGAN-HQ | 45% | 75% | 68% | 50% | 45% | 45% |
| Real: FFHQ Fake: Style-v5 | 24% | 28% | 3% | 19% | 50% | 52% |
| Real: FFHQ Fake: Style-v7 | 25% | 27% | 4% | 19% | 50% | 53% |
| Real: FFHQ Fake: Style-v10 | 27% | 28% | 6% | 18% | 49% | 51% |
| Real: FFHQ Fake: Style2-v5 | 43% | 65% | 58% | 50% | 70% | 77% |
| Real: FFHQ Fake: Style2-v10 | 49% | 65% | 59% | 50% | 72% | 78% |
| Real: CelebA-128 Fake: ProGAN-v0 | 100% | 95% | 98% | 70% | 100% | 100% |
| Real: CelebA-128 Fake: ProGAN-v1 | 100% | 88% | 97% | 68% | 99% | 99% |
| Real: CelebA-128 Fake: SNGAN | 100% | 78% | 90% | 70% | 93% | 91% |

In the embodiments of the present disclosure, purely CNN learned features have higher specificity but lower generalizability. The hand-crafted features perform better in terms of generalizability. The system consistent with the present disclosure combines multiple binary attribute networks to improve the model generalizability when the group sparsity selection is used in the process of combining. Assisted by the pre-processing of the inputted image, the system is able to detect fake images from unknown sources with a substantially high accuracy.

The present disclosure further provides a method for detecting fake images. The method includes: obtaining an image for authentication; and hand-crafting a multi-attribute classifier to determine whether the image is authentic. Hand-crafting the multi-attribute classifier includes fusing at least an image classifier, an image spectrum classifier, a co-occurrence matrix classifier, and a one-dimensional (1D) power spectrum density (PSD) classifier. The multi-attribute classifier is trained by pre-processing training images to generate an attribute-specific training dataset to train each of the image classifier, the image spectrum classifier, the co-occurrence matrix classifier, and the 1D PSD classifier.

In some embodiments, each of the image classifier, the image spectrum classifier, and the co-occurrence matrix classifier includes a multi-layer convolutional neural network (CNN), and the 1D PSD classifier includes a single layer CNN.

In some embodiments, the single layer CNN includes a 1×1×80 convolutional layer. The multi-layer CNN includes a 128×128×3 convolutional layer, a 128×128×16 convolutional layer, a 64×64×32 convolutional layer, a 32×32×64 convolutional layer, a 16×16×128 convolutional layer, a 8×8×256 convolutional layer, a 4×4×512 convolutional layer, and a 1×1×512 convolutional layer, that are cascaded together.

In some embodiments, pre-processing the training images to generate the attribute-specific training dataset to train each of the image classifier, the image spectrum classifier, the co-occurrence matrix classifier, and the 1D PSD classifier includes: performing an augmentation process on the training images to obtain a set of augmented training images and performing a mixup process on the set of augmented training images to generate the attribute-specific training dataset to train the image classifier.

In some embodiments, pre-processing the training images to generate the attribute-specific training dataset to train each of the image classifier, the image spectrum classifier, the co-occurrence matrix classifier, and the 1D PSD classifier includes: performing an augmentation process on the training images to obtain a set of augmented training images, performing a mixup process on the set of augmented training images to obtain a set of mixup training images, and performing a discrete Fourier transform (DFT) process on the set of mixup training images to generate the attribute-specific training dataset to train the image spectrum classifier.

In some embodiments, pre-processing the training images to generate the attribute-specific training dataset to train each of the image classifier, the image spectrum classifier, the co-occurrence matrix classifier, and the 1D PSD classifier includes: performing an augmentation process on the training images to obtain a set of augmented training images, performing a mixup process on the set of augmented training images to obtain a set of mixup training images, and computing co-occurrence matrices directly on pixels on the set of mixup training images on each of the red, green and blue channels to generate the attribute-specific training dataset to train the co-occurrence matrix classifier.

In some embodiments, pre-processing the training images to generate the attribute-specific training dataset to train each of the image classifier, the image spectrum classifier, the co-occurrence matrix classifier, and the 1D PSD classifier includes: performing an augmentation process on the training images to obtain a set of augmented training images, performing a mixup process on the set of augmented training images to obtain a set of mixup training images, performing a discrete Fourier transform on the set of mixup training images to obtain a set of two-dimensional (2D) amplitude spectrums of the set of mixup training images, and performing an azimuthal averaging of the set of 2D amplitude spectrums to generate the attribute-specific training dataset to train the 1D PSD classifier.

In some embodiments, the augmentation process includes rotation, translation, cropping, resizing, JPEG compression, flipping, blurring, random erasing, or a combination thereof.

In some embodiments, the mixup process includes random convex combination of raw inputs, and convex combination of one-hot label encodings.

In some embodiments, fusing at least the image classifier, the image spectrum classifier, the co-occurrence matrix classifier, and the 1D PSD classifier includes simultaneously performing neuron pruning and feature selection in a fusion neural network while optimizing weights of the fusion neural network using a sparse group lasso algorithm during a training stage of the fusion neural network.

In the embodiments of the present disclosure, the method consistent with the present disclosure combines multiple binary attribute networks to improve the model generalizability when the group sparsity selection is used in the process of combining. Assisted by the pre-processing of the inputted image, the method is able to detect fake images from unknown sources with a substantially high accuracy.

Figure 12:
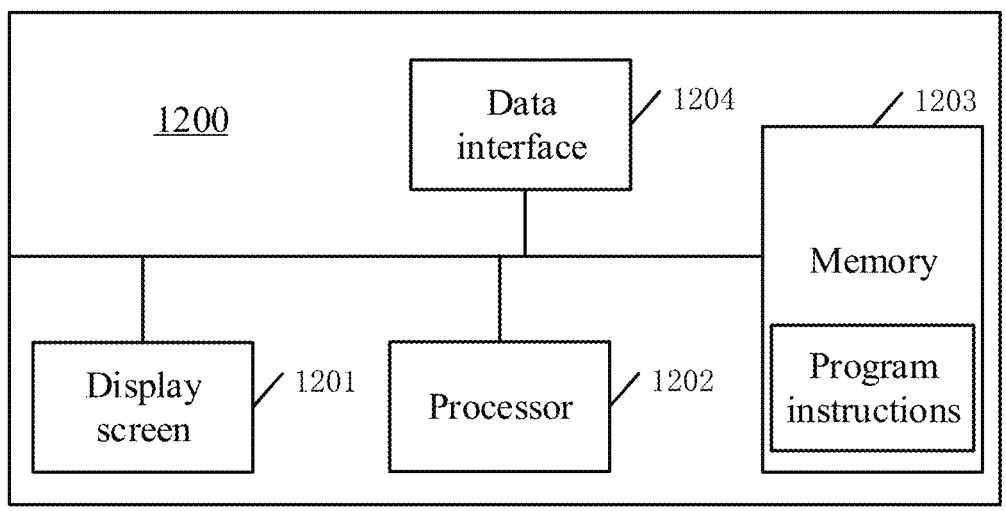
FIG. 12 illustrates a schematic block diagram of an exemplary system for detecting fake images according to various disclosed embodiments of the present disclosure.

The present disclosure also provides another system for detecting fake images. FIG. 12 illustrates a schematic block diagram of an exemplary system for detecting fake images according to various disclosed embodiments of the present disclosure. As shown in FIG. 12, the system includes a display screen 1201, a processor 1202, a memory 1203, and a data interface 1204.

The display screen 1201 may be a liquid crystal display (LCD) or an organic light-emitting diode (OLED) display. The display screen may also be a touch screen. The processor 1202 may be a central processing unit (CPU). The processor 1202 may also include a hardware chip. The hardware chip may be an application-specific integrated circuit (ASIC), a programmable logic device (PLD), or a combination thereof. For example, the PLD may be a complex programmable logic device (CPLD), a field-programmable gate array (FPGA), or a combination thereof. The memory 1203 may include a volatile memory. The memory 1203 may also include a non-volatile memory. The memory 1203 may also include a combination of the foregoing types of memories. The data interface 1204 may include a keyboard, a mouse, a USB interface, and a communication interface. A user may use the keyboard, the mouse, and the USB interface to input the images for authentication.

In some embodiments, the memory 1203 stores program instructions. When the program instructions are executed, the processor 1202 calls the program instructions stored in the memory 1203 to perform: obtaining an image for authentication, and hand-crafting a multi-attribute classifier to determine whether the image is authentic. Hand-crafting the multi-attribute classifier includes fusing at least an image classifier, an image spectrum classifier, a co-occurrence matrix classifier, and a one-dimensional (1D) power spectrum density (PSD) classifier. The multi-attribute classifier is trained by pre-processing training images to generate an attribute-specific training dataset to train each of the image classifier, the image spectrum classifier, the co-occurrence matrix classifier, and the 1D PSD classifier In the embodiments of the present disclosure, the system consistent with the present disclosure combines multiple binary attribute networks to improve the model generalizability when the group sparsity selection is used in the process of combining. Assisted by the pre-processing of the inputted image, the system is able to detect fake images from unknown sources with a substantially high accuracy.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:
1. A method for detecting fake images, comprising:
obtaining an image for authentication; and
hand-crafting a multi-attribute classifier to determine whether the image is authentic;
wherein:
hand-crafting the multi-attribute classifier includes fusing at least an image classifier, an image spectrum classifier, a co-occurrence matrix classifier, and a one-dimensional (1D) power spectrum density (PSD) classifier by performing:
simultaneously performing neuron pruning and feature selection in a fusion neural network while optimizing weights of the fusion neural network using a sparse group lasso algorithm during a training stage of the fusion neural network; and the multi-attribute classifier is trained by pre-processing training images to generate an attribute-specific training dataset to train each of the image classifier, the image spectrum classifier, the co-occurrence matrix classifier, and the 1D PSD classifier.

2. The method according to claim 1, wherein:
each of the image classifier, the image spectrum classifier, and the co-occurrence matrix classifier includes a multi-layer convolutional neural network (CNN); and
the 1D PSD classifier includes a single layer CNN.

3. The method according to claim 2, wherein:
the single layer CNN includes a 1×1×80 convolutional layer; and
the multi-layer CNN includes a 128×128×3 convolutional layer, a 128×128×16 convolutional layer, a 64×64×32 convolutional layer, a 32×32×64 convolutional layer, a 16×16×128 convolutional layer, a 8×8×256 convolutional layer, a 4×4×512 convolutional layer, and a 1×1×512 convolutional layer, that are cascaded together.

4. The method according to claim 1, wherein pre-processing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images; and
performing a mixup process on the set of augmented training images to generate the attribute-specific training dataset to train the image classifier.

5. The method according to claim 1, wherein pre-processing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images;
performing a mixup process on the set of augmented training images to obtain a set of mixup training images; and
performing a discrete Fourier transform (DFT) process on the set of mixup training images to generate the attribute-specific training dataset to train the image spectrum classifier.

6. The method according to claim 1, wherein pre-processing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images;
performing a mixup process on the set of augmented training images to obtain a set of mixup training images; and
computing co-occurrence matrices directly on pixels on the set of mixup training images on each of the red, green and blue channels to generate the attribute-specific training dataset to train the co-occurrence matrix classifier.

7. The method according to claim 1, wherein pre-processing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images;
performing a mixup process on the set of augmented training images to obtain a set of mixup training images;
performing a discrete Fourier transform on the set of mixup training images to obtain a set of two-dimensional (2D) amplitude spectrums of the set of mixup training images; and
performing an azimuthal averaging of the set of 2D amplitude spectrums to generate the attribute-specific training dataset to train the 1D PSD classifier.

8. The method according to claim 4, wherein the augmentation process includes:
rotation, translation, cropping, resizing, JPEG compression, flipping, blurring, random erasing, or a combination thereof.

9. The method according to claim 4, wherein the mixup process includes:
random convex combination of raw inputs; and
convex combination of one-hot label encodings.

10. A system for detecting fake images, comprising:
a memory storing computer program instructions; and
a processor coupled to the memory and, when executing the computer program instructions, configured to perform:
obtaining an image for authentication; and
hand-crafting a multi-attribute classifier to determine whether the image is authentic;
wherein:
hand-crafting the multi-attribute classifier includes fusing at least an image classifier, an image spectrum classifier, a co-occurrence matrix classifier, and a one-dimensional (1D) power spectrum density (PSD) classifier by performing:
simultaneously performing neuron pruning and feature selection in a fusion neural network while optimizing weights of the fusion neural network using a sparse group lasso algorithm during a training stage of the fusion neural network; and
the multi-attribute classifier is trained by pre-processing training images to generate an attribute-specific training dataset to train each of the image classifier, the image spectrum classifier, the co-occurrence matrix classifier, and the 1D PSD classifier.

11. The system according to claim 10, wherein:
each of the image classifier, the image spectrum classifier, and the co-occurrence matrix classifier includes a multi-layer convolutional neural network (CNN); and
the 1D PSD classifier includes a single layer CNN.

12. The system according to claim 11, wherein:
the single layer CNN includes a 1×1×80 convolutional layer; and
the multi-layer CNN includes a 128×128×3 convolutional layer, a 128×128×16 convolutional layer, a 64×64×32 convolutional layer, a 32×32×64 convolutional layer, a 16×16×128 convolutional layer, a 8×8×256 convolutional layer, a 4×4×512 convolutional layer, and a 1×1×512 convolutional layer, that are cascaded together.

13. The system according to claim 10, wherein pre-processing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images; and performing a mixup process on the set of augmented training images to generate the attribute-specific training dataset to train the image classifier.

14. The system according to claim 10, wherein preprocessing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images;
performing a mixup process on the set of augmented training images to obtain a set of mixup training images; and
performing a discrete Fourier transform (DFT) process on the set of mixup training images to generate the attribute-specific training dataset to train the image spectrum classifier.

15. The system according to claim 10, wherein preprocessing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images;
performing a mixup process on the set of augmented training images to obtain a set of mixup training images; and
computing co-occurrence matrices directly on pixels on the set of mixup training images on each of the red, green and blue channels to generate the attribute-specific training dataset to train the co-occurrence matrix classifier.

16. The system according to claim 10, wherein preprocessing the training images to generate the attribute-specific training dataset to train each of the image classifier, the image spectrum classifier, the co-occurrence matrix classifier, and the 1D PSD classifier includes:
performing an augmentation process on the training images to obtain a set of augmented training images;
performing a mixup process on the set of augmented training images to obtain a set of mixup training images;
performing a discrete Fourier transform on the set of mixup training images to obtain a set of two-dimensional (2D) amplitude spectrums of the set of mixup training images; and
performing an azimuthal averaging of the set of 2D amplitude spectrums to generate the attribute-specific training dataset to train the 1D PSD classifier.

17. The system according to claim 13, wherein the augmentation process includes:
rotation, translation, cropping, resizing, JPEG compression, flipping, blurring, random erasing, or a combination thereof.

18. The system according to claim 13, wherein the mixup process includes:
random convex combination of raw inputs; and
convex combination of one-hot label encodings.

* * * * *